（12）United States Patent
Dry

(10) Patent No.: US 10,017,080 B2
(45) Date of Patent: Jul. 10, 2018

(54) SINGLE SPRING FOR MANUAL RECLINE

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 15/214,613

(22) Filed: Jul. 20, 2016

(65) Prior Publication Data

US 2018/0022240 A1    Jan. 25, 2018

(51) Int. Cl.
*B60N 2/22* (2006.01)
*B60N 2/20* (2006.01)
*B60N 2/30* (2006.01)

(52) U.S. Cl.
CPC ............ *B60N 2/22* (2013.01); *B60N 2/20* (2013.01); *B60N 2/3011* (2013.01)

(58) Field of Classification Search
CPC ........... B60N 2/22; B60N 2/20; B60N 2/3011
See application file for complete search history.

(56) References Cited

U.S. PATENT DOCUMENTS

| | | | |
|---|---|---|---|
| 5,390,977 A * | 2/1995 | Miller | B60N 2/48 280/806 |
| 5,979,980 A * | 11/1999 | Amorin | B60N 2/643 297/218.3 |
| 6,905,173 B2 | 6/2005 | Tame et al. | |
| 7,344,195 B2 | 3/2008 | Folkert et al. | |
| 7,717,509 B2 | 5/2010 | Kojima | |
| 7,722,120 B2 * | 5/2010 | Toyooka | B60N 2/22 297/301.3 |
| 7,976,103 B2 | 7/2011 | Gamache et al. | |
| 8,360,529 B2 * | 1/2013 | Armbruster | B60N 2/206 297/285 |
| 8,424,968 B2 * | 4/2013 | Humer | B60N 2/22 267/160 |
| 9,102,247 B2 | 8/2015 | Li et al. | |
| 2012/0049599 A1 | 3/2012 | Barzen et al. | |
| 2014/0265505 A1 * | 9/2014 | Li | B60N 2/20 297/354.13 |

* cited by examiner

*Primary Examiner* — Philip F Gabler
(74) *Attorney, Agent, or Firm* — Vichit Chea; Price Heneveld LLP

(57) ABSTRACT

A vehicle seating assembly includes a seat having first and second retainers. A seatback includes a lower cross-member extending between the first and second retainers. An aperture is located in the lower cross-member. A single torsion bar extends between the first and second retainers and is operably coupled therewith. The torsion bar includes an intermediate portion having first and second engagement portions, which are insertably engaged with the aperture. First and second linear portions extend between the first retainer and the first engagement portion and the second retainer and the second engagement portion, respectively. First and second distal ends are configured to engage the first and second retainers, respectively, which induces a torsional resistance in the torsion bar when the seatback is displaced from a zero torsion position. The torsion bar is at the zero torsion position when the seatback is displaced rotationally forward from a design position.

16 Claims, 8 Drawing Sheets

SINGLE SPRING FOR MANUAL RECLINE

FIELD OF THE DISCLOSURE

The present disclosure generally relates to a seating assembly, and more particularly to a single spring for manual recline seating assembly.

BACKGROUND

Seating assemblies typically include a seatback to support a back of an occupant in an upright sitting position and various reclined positions. Similar to other portions of a seating assembly, seatbacks are commonly designed to support an occupant in the upright sitting position upon acceleration, change in direction, and collision of the vehicle. Accordingly, seatbacks are substantially rigid and sizeable in construction.

SUMMARY OF THE DISCLOSURE

According to one aspect of the present disclosure, a vehicle seating assembly includes a seat having first and second retainers. A seatback includes a lower cross-member extending between the first and second retainers. An aperture is located in the lower cross-member. A single torsion bar extends between the first and second retainers and is operably coupled therewith. The torsion bar includes an intermediate portion having first and second engagement portions. The first and second engagement portions are insertably engaged with the aperture. First and second linear portions extend between the first retainer and the first engagement portion and the second retainer and the second engagement portion, respectively. First and second distal ends are configured to engage the first and second retainers, respectively, which induces a torsional resistance in the torsion bar when the seatback is displaced from a zero torsion position. The torsion bar is at the zero torsion position when the seatback is displaced rotationally forward from a design position.

According to another aspect of the present disclosure, a vehicle seating assembly includes a seatback having a lower cross-member extending between a first and second retainer of a seat. An aperture is located in the lower cross-member. A torsion bar includes an engagement feature engaged with the aperture. The torsion bar extends between and engaged with the first and second retainers. A torsional resistance is induced in the torsion bar when the seatback is in a design position.

According to yet another aspect of the present disclosure, a vehicle seating assembly includes a seatback having a lower cross-member. An aperture is located in the lower cross-member. An intermediate portion of a torsion bar is insertably engaged with the aperture. First and second distal ends of the torsion bar are configured to engage first and second retainers of a seat, respectively.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
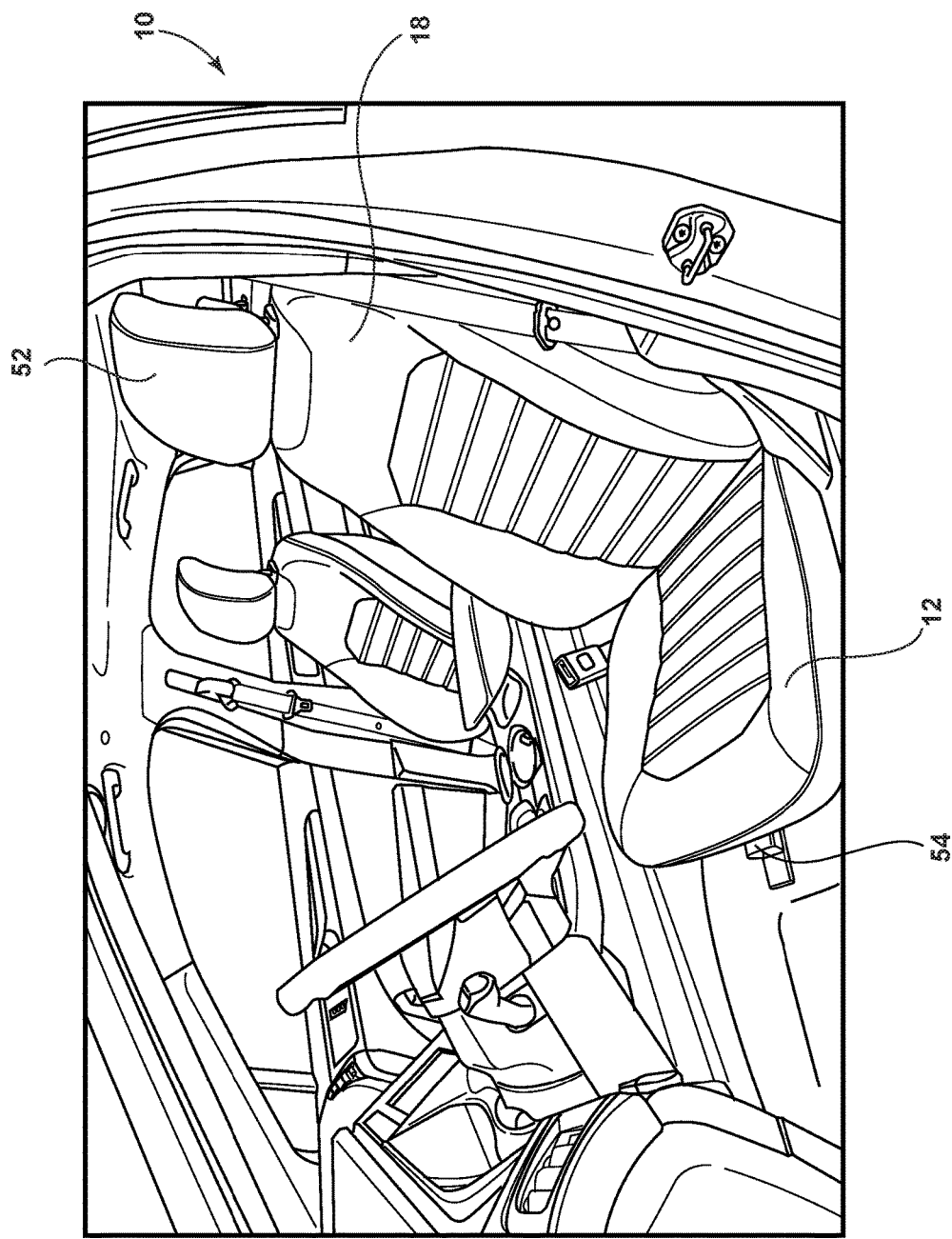
FIG. 1 is a front perspective view of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-9, reference numeral 10 generally designates a vehicle seating assembly including a seat 12 having first and second retainers 14, 16. A seatback 18 includes a seatback frame 19 having a lower cross-member 20 extending between the first and second retainers 14, 16. An aperture 22 is located in the lower cross-member 20. A single torsion bar 24 extends between the first and second retainers 14, 16 and is operably coupled therewith. The torsion bar 24 includes an intermediate portion 30 having an engagement feature 31 with first and second engagement portions 32, 34. The first and second engagement portions 32, 34 are insertably engaged with the aperture 22. A first linear portion 36 extends between the first retainer 14 and the first engagement portion 32, and a second linear portion 38 extends between the second retainer 16 and the second engagement portion 34. First and second distal ends 40, 42 are configured to engage the first and second retainers 14, 16, respectively, which induces a torsional resistance in the torsion bar 24 when the seatback 18 is displaced from a zero torsion position. The torsion bar 24 is at the zero torsion position when the seatback 18 is displaced rotationally forward from a design position.

With reference again to FIG. 1, the concept as set forth herein is generally configured for use in a vehicle. However, it will be understood that this concept could also be applied to other industries. As illustrated in FIG. 1, the concept may be applied to a vehicle seating assembly 10. The seatback 18 is generally configured for pivotal rotation relative to the seat 12. In addition, the seatback 18 includes a headrest 52 that may be configured for forward, lateral, or vertical movement relative to the seatback 18. Other features of the vehicle seating assembly 10, including fore and after movement of the vehicle seating assembly 10 on a rail slide assembly 54 within the vehicle are also possible.

Figure 2:
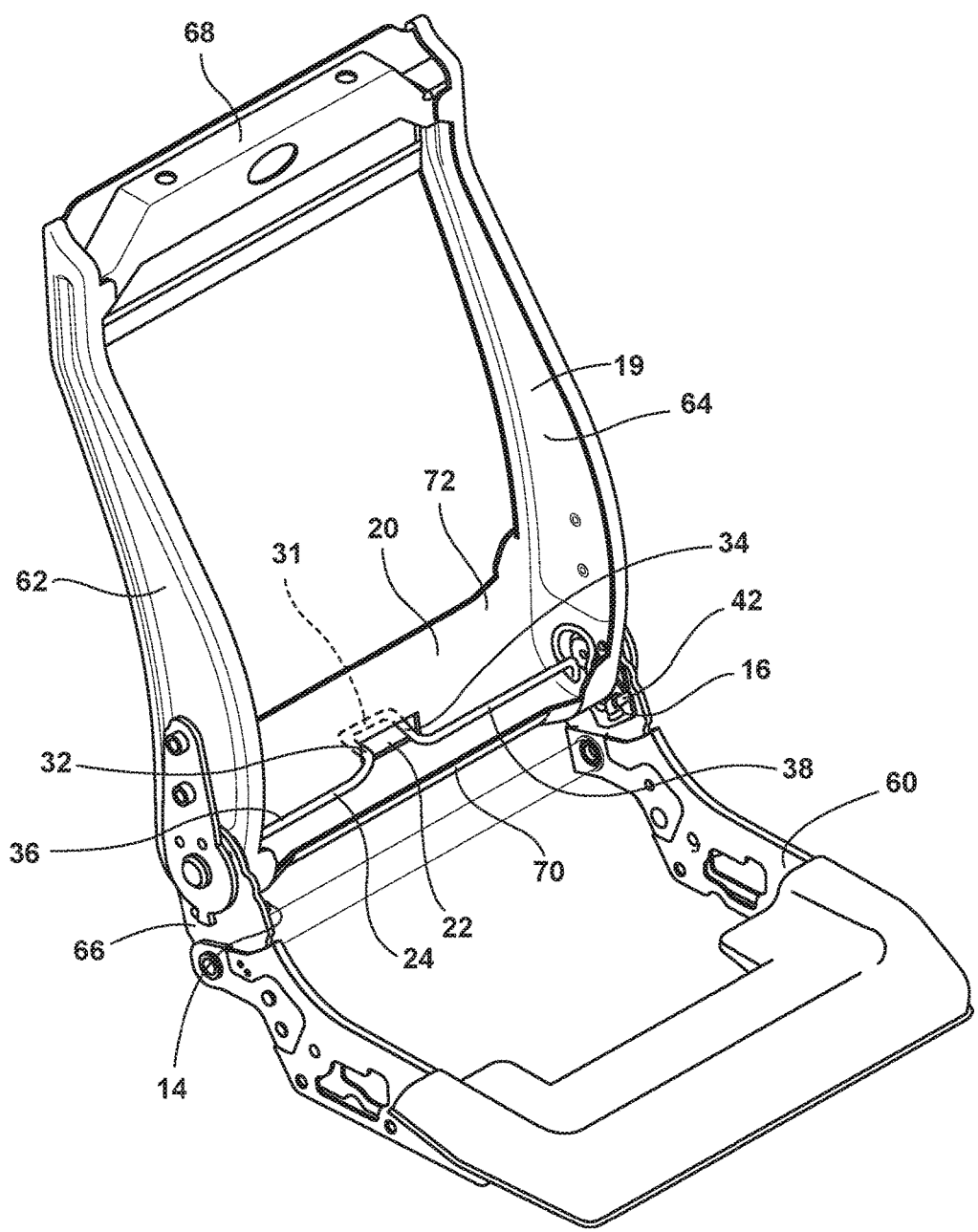
FIG. 2 is an enlarged front perspective view of a seat frame of the seating assembly of FIG. 1.

With reference to FIG. 2, the seatback frame 19, as well as a seat frame 60, are illustrated. The seatback frame 19 includes first and second side frame members 62, 64 that are operably coupled with the seat frame 60 via brackets 66. The brackets 66 allow for rotational movement of the seatback 18 relative to the seat 12. In addition, the seatback 18 also includes a top cross-member 68, as well as the lower cross-member 20. The lower cross-member 20 includes an arcuate body with a rounded lower wall 70 and a rear vertical wall 72. The rear vertical wall 72 includes the aperture 22. The single torsion bar 24 extends forward of the rear vertical wall 72 of the lower cross-member 20 and above the lower wall of the lower cross-member 20. In addition, the engagement feature 31 is configured to extend into the aperture 22.

Figure 3:
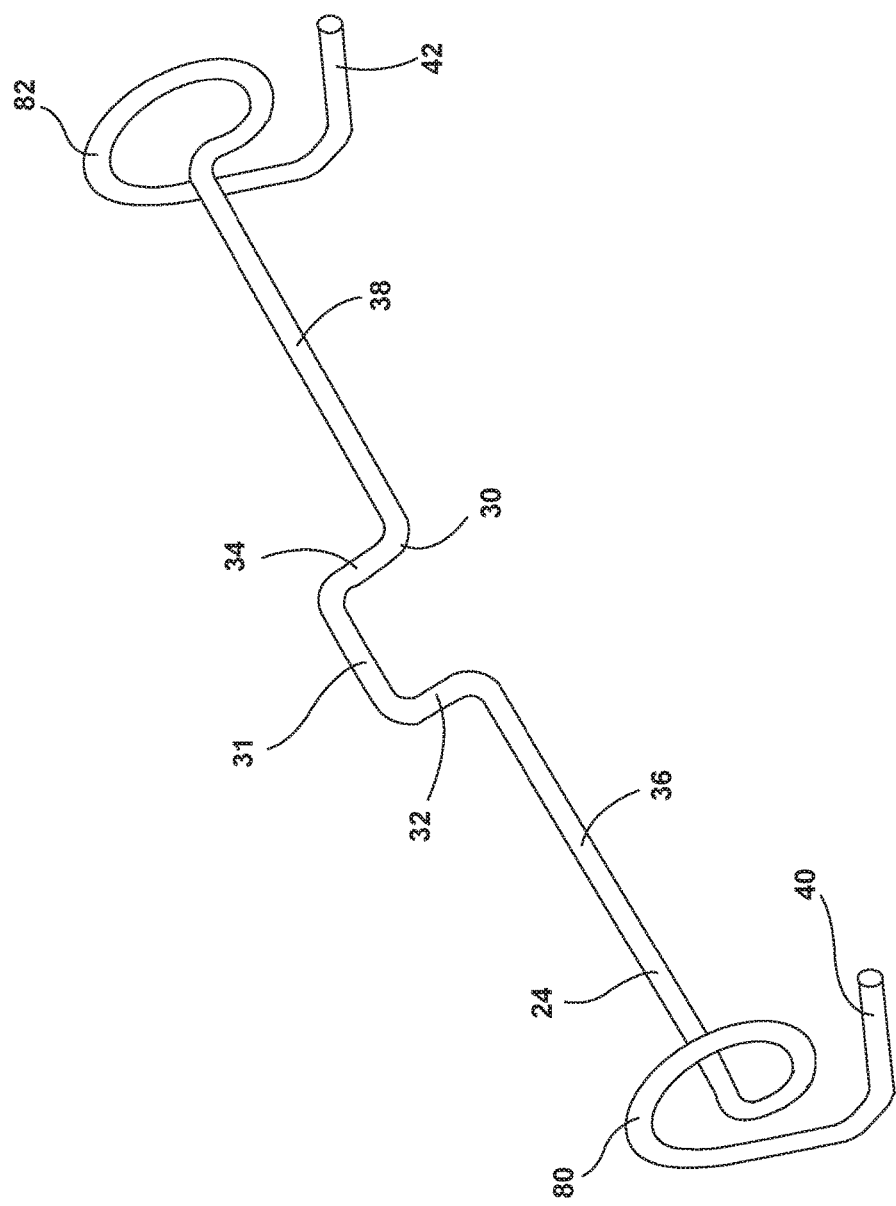
FIG. 3 is a front perspective view of a portion of a lower cross-member of the seating assembly of FIG. 1.
Figure 5:
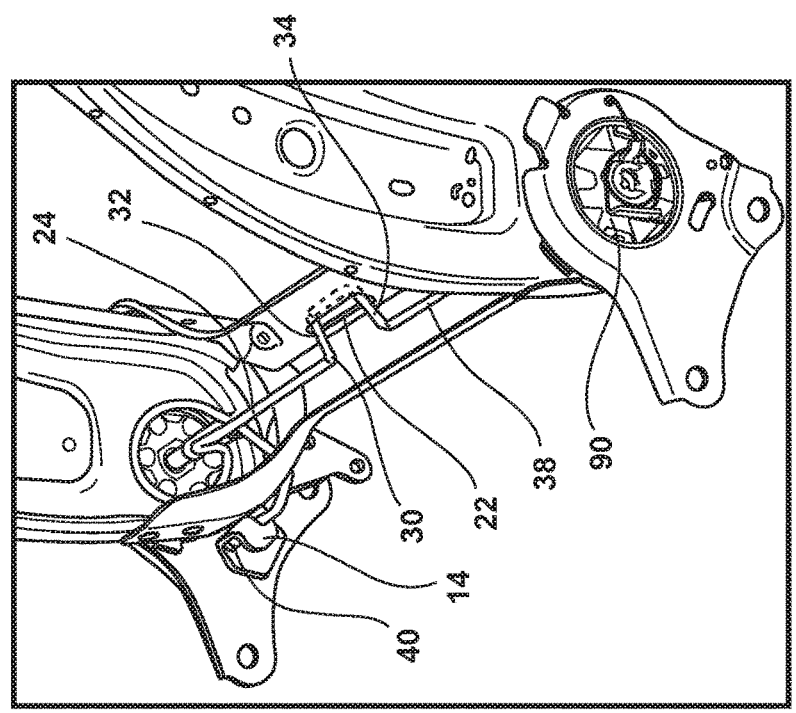
FIG. 5 is a front perspective view of a seat frame and lower cross-member of the present disclosure.
Figure 4:
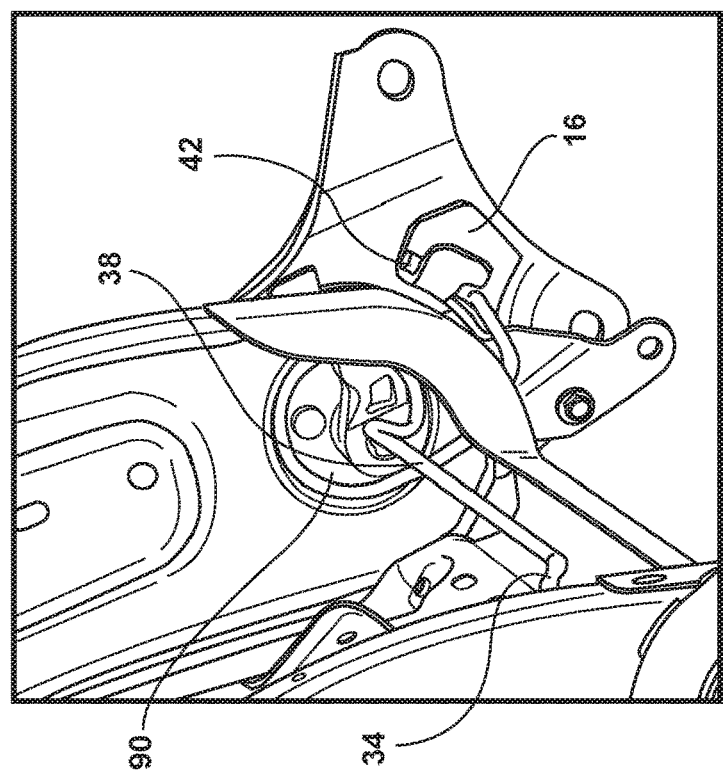
FIG. 4 is a front perspective view of a seat frame and a lower cross-member of the present disclosure.

With reference now to FIGS. 3-5, the torsion bar 24 is configured to apply an upward force (rotation forward) to the seatback 18 when the seatback 18 is fully reclined, and also an upward force (rotation rearward) to the seatback 18 when the seatback 18 is in a forward stowed position. The torsion bar 24 extends laterally across the seatback 18.

The torsion bar 24 is illustrated in FIG. 3 and includes the forwardly-extending distal ends 40, 42. A first spring portion 80, which includes a rounded configuration, extends between the first distal end 40 and the torsion bar 24. A second spring portion 82 is disposed between the second distal end 42 and the second linear portion 38 of the torsion bar 24. Each of the first and second spring portions 80, 82 generally define a torque rod/clock spring hybrid. Stated differently, the first spring portion 80 and the distal end 40 include characteristics of both a torque rod and a clock spring. The same is true for the second spring portion 82 and the distal end 42. It is the first and second spring portions 80, 82 and the elastic qualities of the first and second spring portions 80, 82 that allow for movement of the engagement feature 31 relative to the first and second spring portions 80, 82. In addition, the first and second spring portions 80, 82 are generally configured to extend about a recliner heart 90 disposed proximate the first and second side frame members 62, 64. Accordingly, the torsion bar 24 includes a very minimal profile and has minimal impact to the overall volume of the seat 12 or the weight of the seat 12. The intermediate portion 30 is substantially U-shaped and is pivotally coupled to the lower cross-member 20.

As illustrated in FIGS. 4 and 5, the distal ends 40, 42 engage the first and second retainers 14, 16. At the same time, the engagement feature 31 engages the aperture 22. When the seatback 18 is in a desired position, no force is applied to the seatback 18 to move upward. However, as the seat 12 rotates or reclines to a rearward position, a tensile force is placed on the torsion bar 24, which causes the compressive qualities of the torsion bar 24 to apply an upward force to the seatback 18, as will be discussed in further detail herein.

Figure 6:
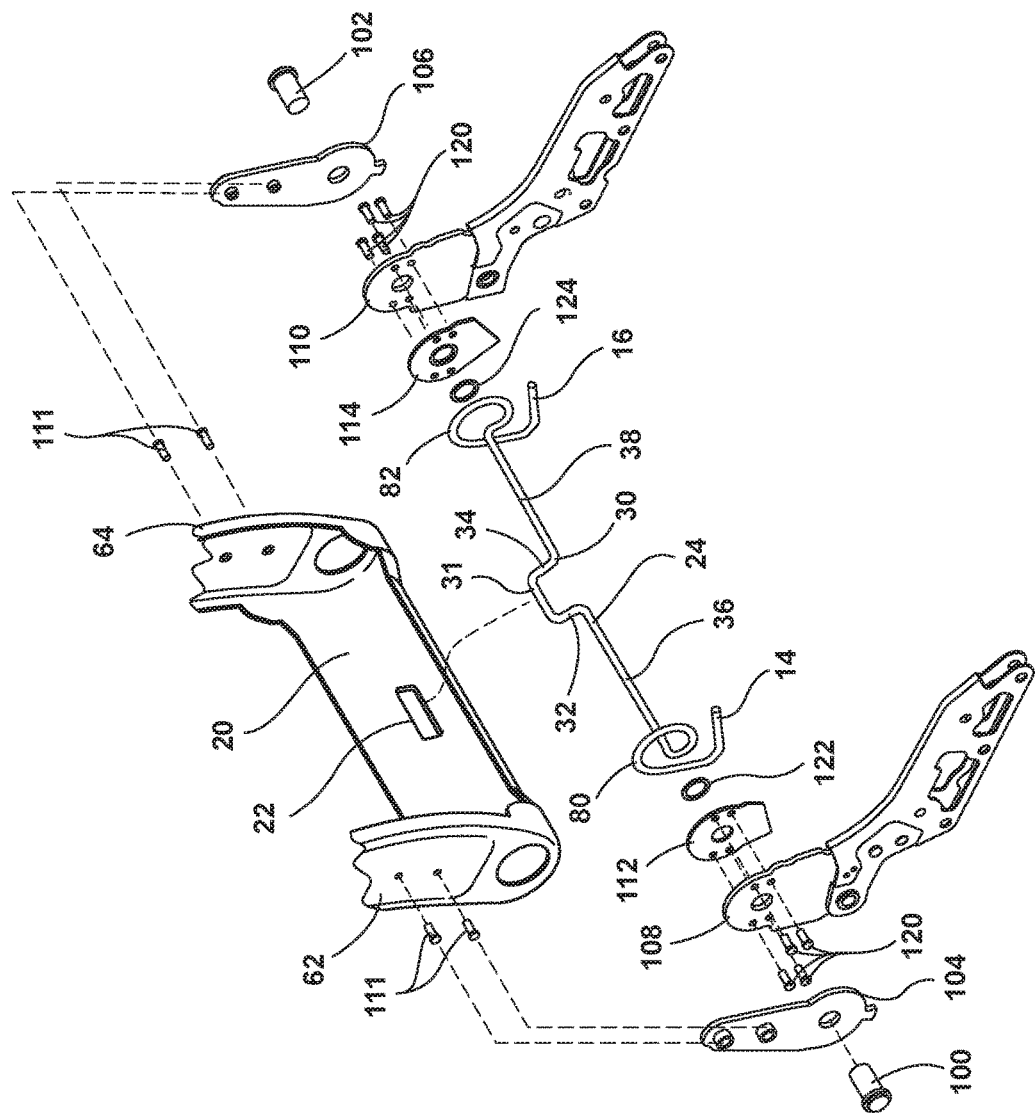
FIG. 6 is an exploded front perspective view of a single torsion bar of the present disclosure.

With reference now to FIG. 6, the seatback 18 includes first and second pivot rods 100, 102 disposed on the first and second sides of the seat frame 60. The first and second pivot rods 100, 102 each extend through seatback brackets 104, 106 and engagement portions 108, 110, respectively, of the seat frame 60. The seatback brackets 104, 106 are also coupled with the first and second side frame members 62, 64, respectively, via fasteners 111. In addition, first and second inside brackets 112, 114 are secured to the engagement portions 108, 110, respectively, of the seat frame 60 via fasteners 120. First and second washers 122, 124 are disposed inside the first and second inside brackets 112, 114. The first and second spring portions 80, 82 of the torsion bar 24 are generally disposed about the inner portion of each of the first and second inside brackets 112, 114. The seatback 18 is free to rotate relative to the seat 12 about the first and second pivot rods 100, 102. However, the torsion bar 24 applies an upward force to the seatback 18 to return the seatback 18 to a desired position.

Figure 7:
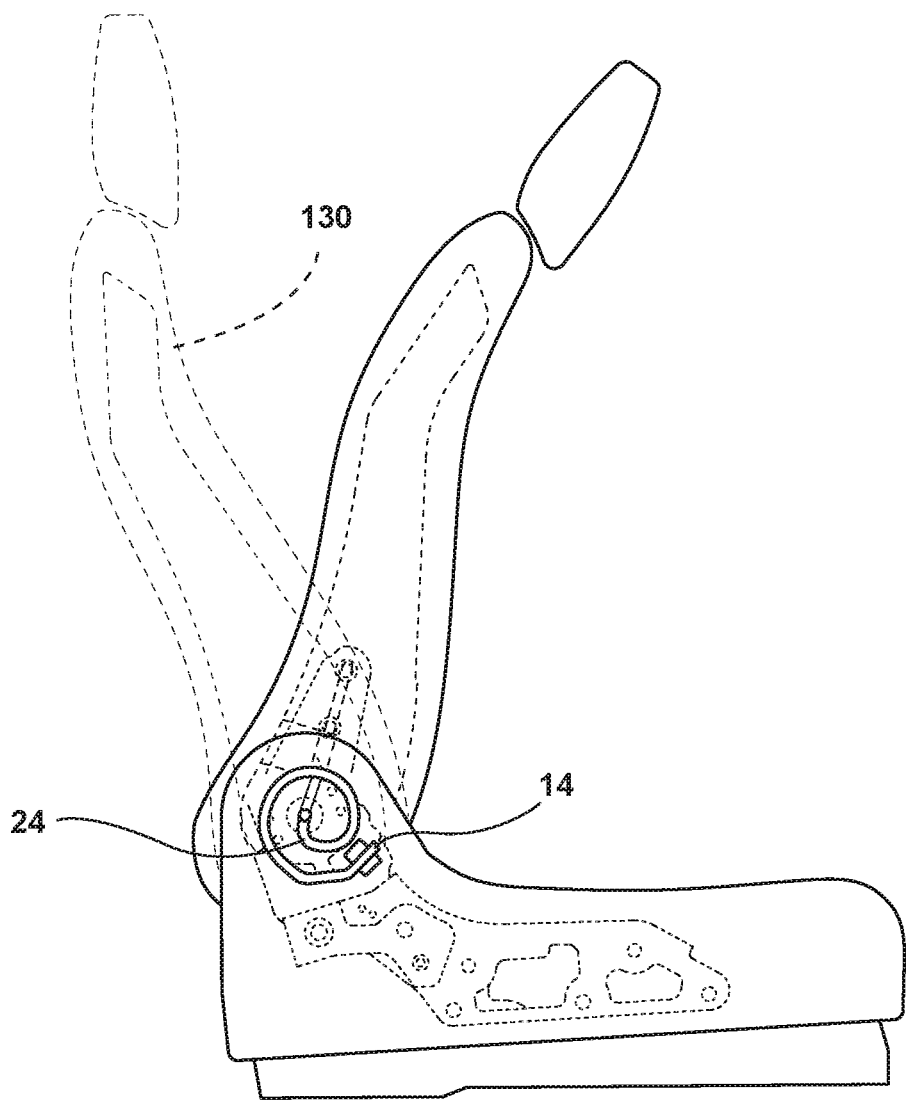
FIG. 7 is a side elevational view of the seating assembly of the present disclosure in a front tilted position.
Figure 8:
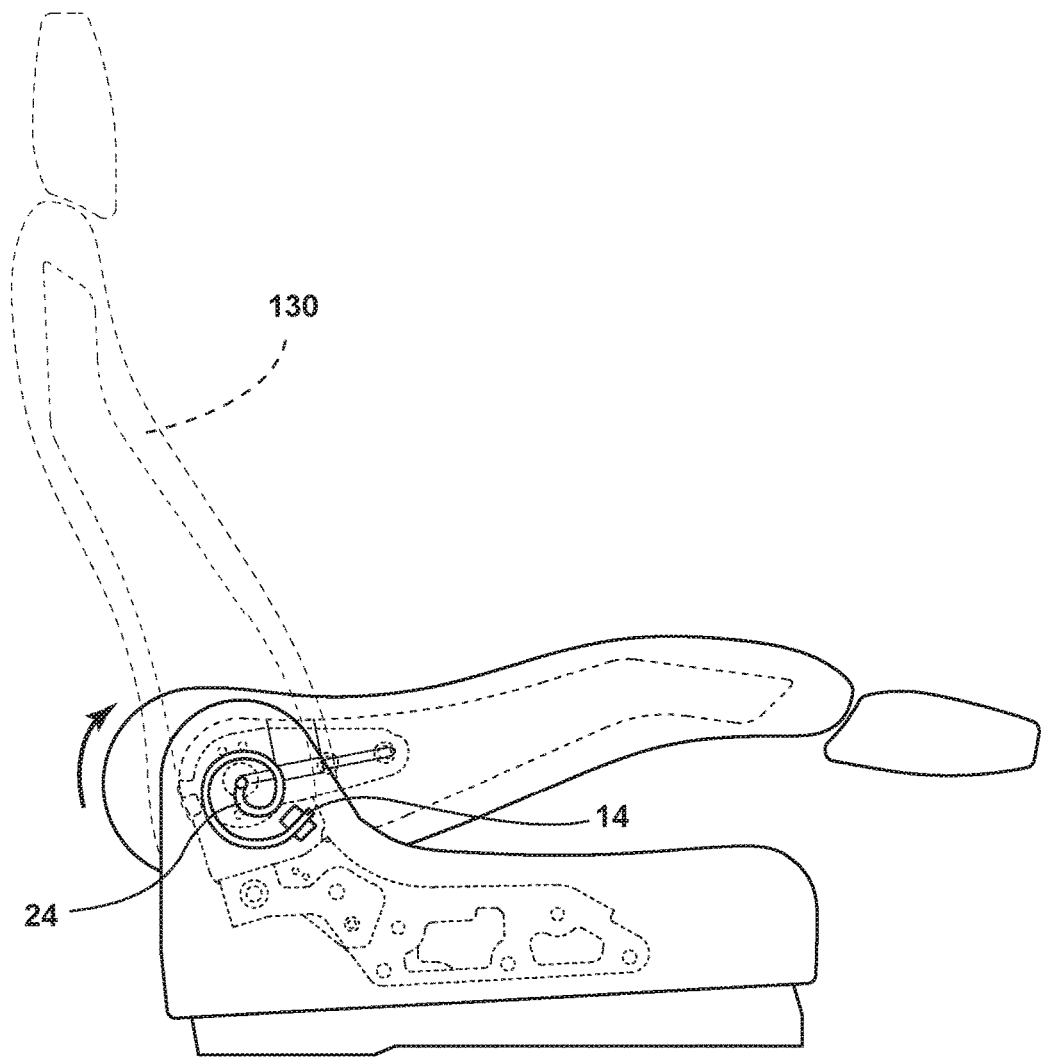
FIG. 8 is a side elevational view of the seating assembly of the present disclosure in a stowed position.
Figure 9:
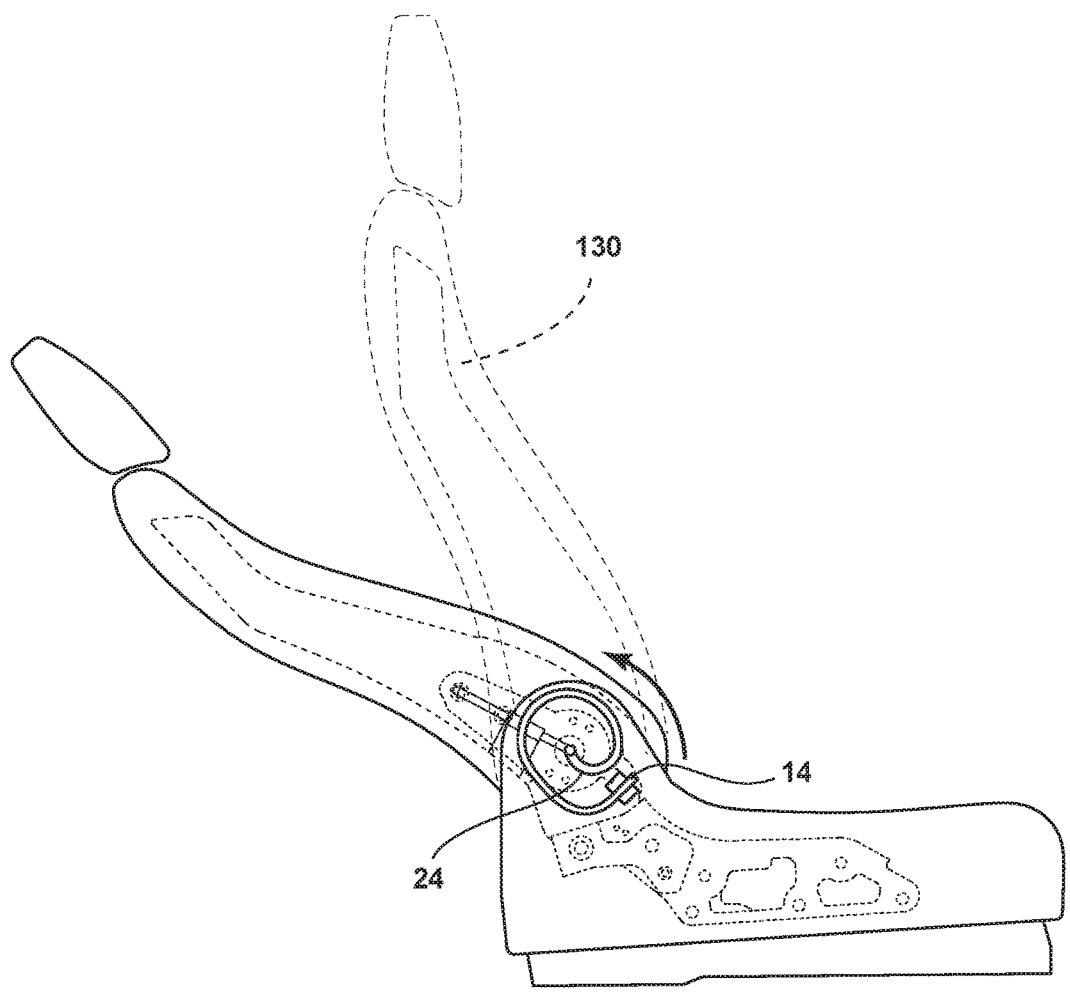
FIG. 9 is a side elevational view of the seating assembly of the present disclosure in a fully reclined position.

With reference now to FIGS. 7-9, a design position 130 is shown in phantom. The design position 130 is a zero torsion position where the torsion bar 24 exhibits no forces on the seatback 18. In this position, the torsion bar 24 applies no torque to the seatback 18. However, if the seat 12 is rotated forward as shown in FIG. 7, or rotated fully forward as shown in FIG. 8, a rearward rotational force is applied to the seatback 18 by the torsion bar 24. Likewise, a forward rotational force is applied to the seatback 18 as shown in FIG. 9 when the seatback 18 is fully reclined. In FIGS. 7 and 8, the first and second spring portions 80, 82 of the torsion bar 24 are compressed, such that the torsion bar 24 applies a force against the compression in an effort to return the torsion bar 24 to original shape and return the seatback 18 to the design position 130. In FIG. 9, the first and second spring portions 80, 82 of the torsion bar 24 are placed in tension. In this instance, the torsion bar 24 applies an upward force to the seatback 18 to return to original shape and move the seatback 18 back to the design position 130. Thus, upon rotational displacement of the seatback 18 forward from the zero torsion position, the torque rod/clock spring hybrids rotational compress, and upon rotational displacement of the seatback 18 rearward from the zero torsion position, the torque rod/clock spring hybrids rotationally expand. Alternatively, the design position 130 and the zero torsion position may be at different seatback 18 positions. For example, it is also contemplated that the torsion bar 24 may be at a zero torsion position when the seatback 18 is rotationally displaced forward of the design position 130 by approximately thirty degrees.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
    a seat having first and second retainers;
    a seatback having a lower cross-member extending between the first and second retainers;
    an aperture in the lower cross-member; and
    a single torsion bar extending between the first and second retainers and operably coupled therewith, the torsion bar including:
        an intermediate portion having first and second engagement portions, wherein both the first and second engagement portions are insertably engaged with the aperture;
        a first linear portion that extends between the first retainer and the first engagement portion, and a second linear portion that extends between the second retainer and the second engagement portion; and
        first and second distal ends that are torque rod clock spring hybrids and are configured to engage the first and second retainers, respectively, which induces a torsional resistance in the torsion bar when the seatback is displaced from a zero torsion position, wherein the torsion bar is at the zero torsion position when the seatback is displaced rotationally forward from a design position, and wherein upon rotational displacement of the seatback forward from the zero torsion position the first and second distal ends rotationally compress and upon rotational displacement of the seatback rearward from the zero position the first and second distal ends rotationally expand.

2. The vehicle seating assembly of claim 1, wherein the first and second distal ends are parallel with respect to each other.

3. The vehicle seating assembly of claim 1, wherein the intermediate portion is substantially U-shaped and is pivotally coupled to the lower cross-member.

4. The vehicle seating assembly of claim 1, wherein the torsion bar extends laterally across the seatback.

5. The vehicle seating assembly of claim 1, wherein the torsion bar is at the zero torsion position when the seatback is rotationally displaced forward of the design position by approximately thirty degrees.

6. A vehicle seating assembly comprising:
    a seatback having a lower cross-member extending between first and second retainers of a seat;
    an aperture in the lower cross-member; and
    a torsion bar including:
        an engagement feature engaged with the aperture;
        first and second distal ends that are torque rod clock spring hybrids engaged with the first and second retainers, respectively, wherein torsional resistance is induced in the torsion bar when the seatback is in a design position.

7. The vehicle seating assembly of claim 6, wherein the engagement feature at least partially defines an intermediate portion of the torsion bar and the intermediate portion is disposed between first and second linear portions, wherein the first and second linear portions are disposed between the first and second distal ends, the first and second distal ends fixedly engaged to the first and second retainers, respectively.

8. The vehicle seating assembly of claim 7, wherein the intermediate portion is substantially U-shaped and is pivotally coupled to the lower cross-member.

9. The vehicle seating assembly of claim 8, wherein pivotal movement of the intermediate portion causes the first and second linear portions to twist in the direction in which the intermediate portion is pivoting.

10. The vehicle seating assembly of claim 6, wherein the torsion bar extends laterally across the seatback.

11. A seating assembly comprising:
    a seatback having a lower cross-member;
    an aperture in the lower cross-member;
    an intermediate portion of a torsion bar insertably engaged with the aperture; and
    first and second distal ends of the torsion bar configured to engage first and second retainers of a seat, respectively, wherein the first and second distal ends rotationally compress when the seatback is pivoted forward and rotationally expand when the seat back if pivoted rearward, and wherein the first and second distal ends are torque rod clock spring hybrids.

12. The seating assembly of claim 11, wherein the first and second distal ends rotationally compress upon rotational displacement of the seatback forward from a zero torsion position and the first and second distal ends rotationally expand upon displacement of the seatback rearward from the zero torsion position.

13. The seating assembly of claim 11, wherein the torsion bar is at a zero torsion position when the seatback is rotationally displaced forward of a design position by approximately thirty degrees.

14. The seating assembly of claim 11, wherein the intermediate portion is substantially U-shaped and is pivotally coupled to the lower cross-member.

15. The seating assembly of claim 14, further comprising:
   first and second linear portions that extend between the first distal end and the intermediate portion and the second distal end and the intermediate portion, respectively.

16. The seating assembly of claim 15, wherein pivotal movement of the intermediate portion causes the first and second linear portions to twist in the direction in which the intermediate portion is pivoting.

* * * * *

UNITED STATES PATENT AND TRADEMARK OFFICE
CERTIFICATE OF CORRECTION

PATENT NO. : 10,017,080 B2
APPLICATION NO. : 15/214613
DATED : July 10, 2018
INVENTOR(S) : Dry Page 1 of 1

It is certified that error appears in the above-identified patent and that said Letters Patent is hereby corrected as shown below:

In the Claims

Column 6:
Claim 11, Line 58;
"if" should be --is--.

Signed and Sealed this
Eighteenth Day of September, 2018

Andrei Iancu
*Director of the United States Patent and Trademark Office*